US012517215B2

(12) United States Patent
Albou et al.

(10) Patent No.: US 12,517,215 B2
(45) Date of Patent: Jan. 6, 2026

(54) VEHICLE ASSEMBLY COMPRISING A RADAR SENSOR AND AN ARRANGEMENT OF LAYERS

(71) Applicant: VALEO VISION, Bobigny (FR)

(72) Inventors: Pierre Albou, Bobigny (FR); Pierre Renaud, Bobigny (FR); Lucas Perdrix, Bobigny (FR)

(73) Assignee: Valeo Vision, Bobigny (FR)

(*) Notice: Subject to any disclaimer, the term of this patent is extended or adjusted under 35 U.S.C. 154(b) by 283 days.

(21) Appl. No.: 18/254,613

(22) PCT Filed: Nov. 17, 2021

(86) PCT No.: PCT/EP2021/082050
§ 371 (c)(1),
(2) Date: May 26, 2023

(87) PCT Pub. No.: WO2022/117350
PCT Pub. Date: Jun. 9, 2022

(65) Prior Publication Data
US 2024/0012099 A1    Jan. 11, 2024

(30) Foreign Application Priority Data

Dec. 1, 2020  (FR) ..................................... 2012489

(51) Int. Cl.
*G01S 7/02* (2006.01)
*G01S 13/931* (2020.01)
(52) U.S. Cl.
CPC ............ *G01S 7/028* (2021.05); *G01S 13/931* (2013.01); *G01S 2013/93271* (2020.01)
(58) Field of Classification Search
CPC .................. G01S 7/028; G01S 13/931; G01S 2013/93271
See application file for complete search history.

(56) References Cited

U.S. PATENT DOCUMENTS 7,538,734 B2 * 5/2009 Fujii ...................... H01Q 1/422
343/872
10,351,077 B2  7/2019 Yamada et al.
(Continued)

FOREIGN PATENT DOCUMENTS

CN    106476717 A    3/2017
EP    3644087 A1    4/2020
(Continued)

OTHER PUBLICATIONS

European Patent Office, International Search Report (with English Translation) and Written Opinion of corresponding International Application No. PCT/EP2021/082050, dated Feb. 24, 2022.
(Continued)

*Primary Examiner* — Vladimir Magloire
*Assistant Examiner* — Nazra Nur Waheed
(74) *Attorney, Agent, or Firm* — Valeo Vision

(57) ABSTRACT

A vehicle assembly including a radar sensor configured to emit radar waves, an arrangement of layers including a primary layer, placed opposite the radar sensor and having an input surface for the radar waves, a secondary layer including at least one relief, with the secondary layer being adjacent to the primary layer and including a primary junction surface with the primary layer and a secondary junction surface with an adjacent tertiary layer, with the tertiary layer including a radar wave output surface parallel to the input surface, the primary layer, the secondary layer and the tertiary layer having a primary refractive index, a secondary refractive index and a tertiary refractive index.

7 Claims, 5 Drawing Sheets

(56) References Cited

U.S. PATENT DOCUMENTS

| | | | |
|---|---|---|---|
| 2011/0047784 A1* | 3/2011 | Ohtake | G01S 7/03 29/600 |
| 2016/0231417 A1* | 8/2016 | Aoki | G01S 7/032 |
| 2019/0018104 A1 | 1/2019 | Cho et al. | |
| 2019/0305410 A1 | 10/2019 | Tokunaga et al. | |
| 2020/0339053 A1* | 10/2020 | Bicego | G01S 13/931 |
| 2020/0343626 A1* | 10/2020 | Rieder | G01S 13/931 |
| 2023/0291089 A1* | 9/2023 | Kobayashi | H01Q 1/3233 |

FOREIGN PATENT DOCUMENTS

| | | | |
|---|---|---|---|
| JP | 2001264422 A | 9/2001 |
| JP | 2019179969 A | 10/2019 |

OTHER PUBLICATIONS

China Patent Office, Search Report of corresponding Chinese Patent Application No. 202180080489.6, dated May 23, 2025, 1 page.

* cited by examiner

[Fig. 1]
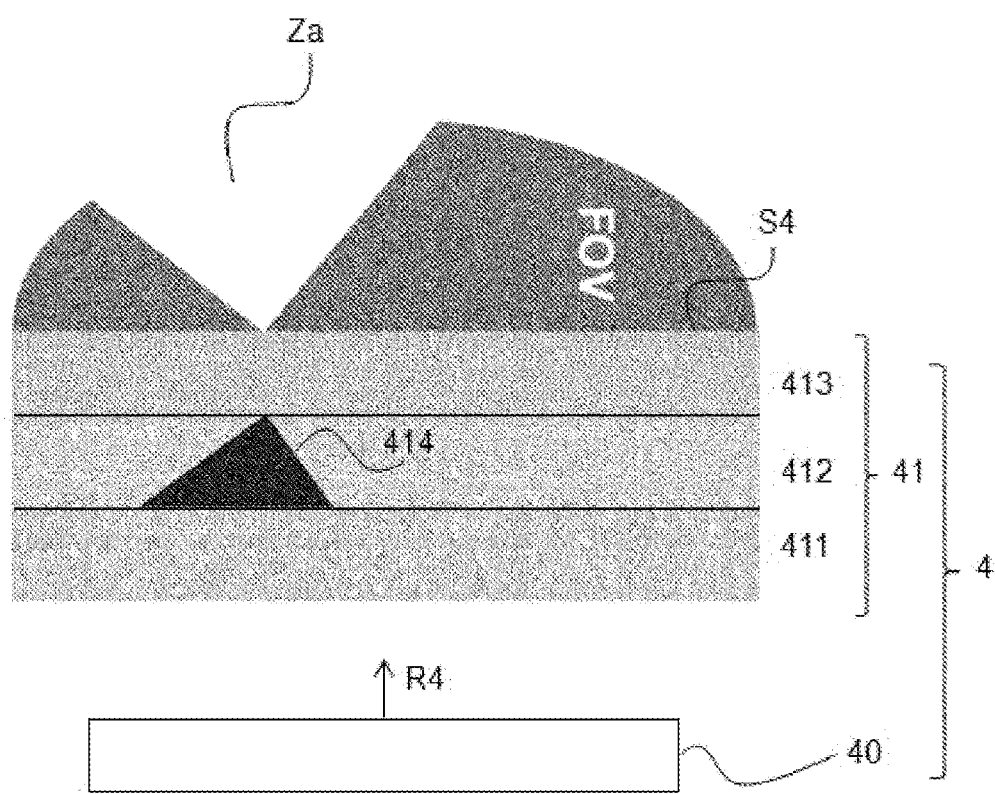

[Fig. 2]
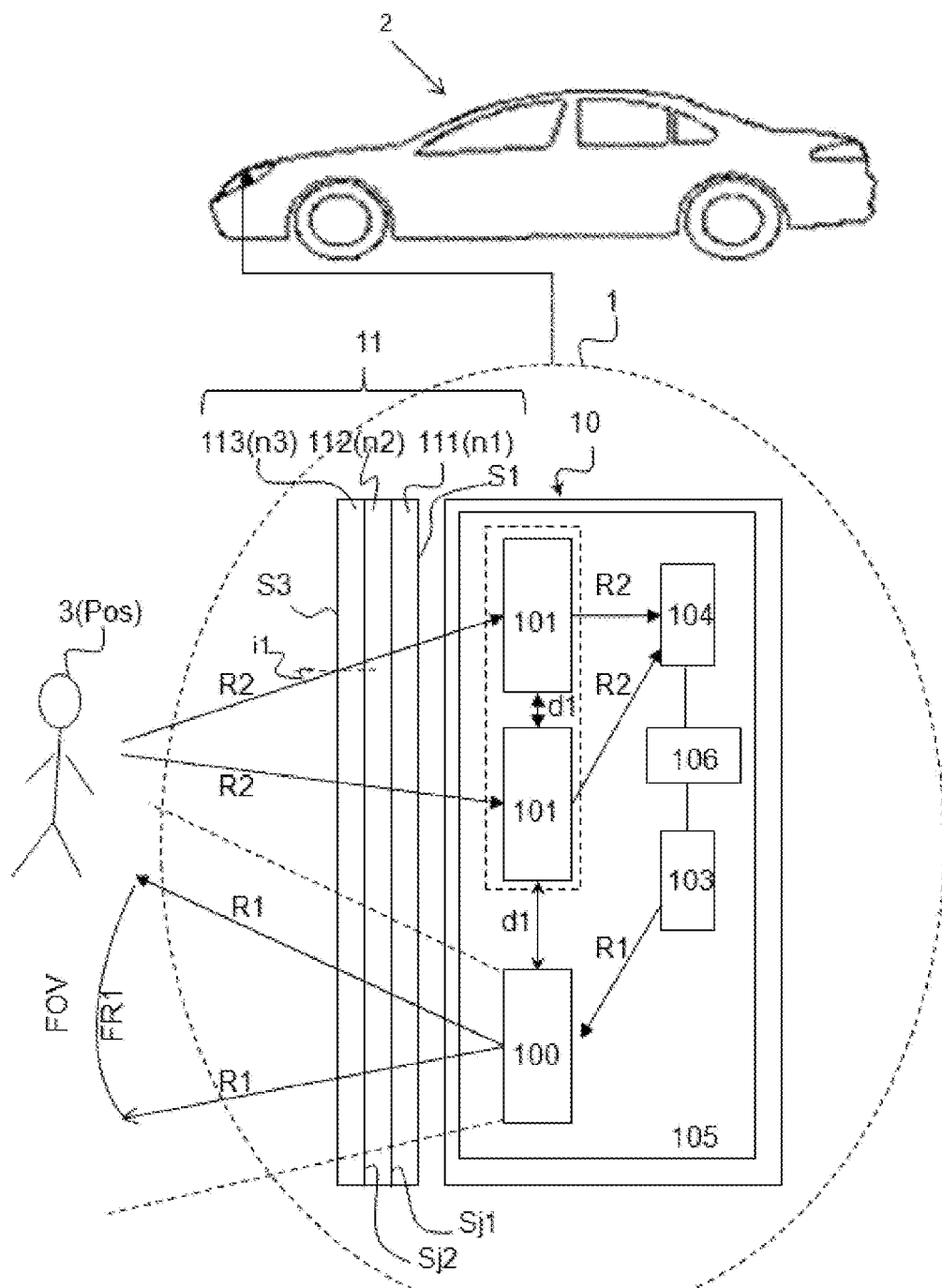

[Fig. 3]
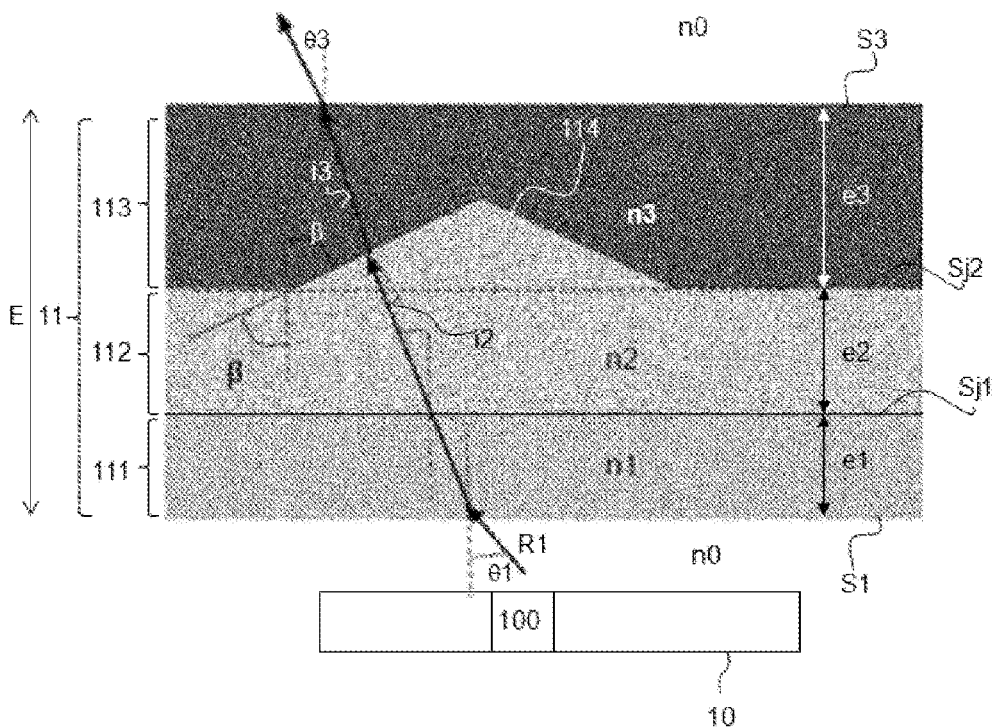
[Fig. 4]
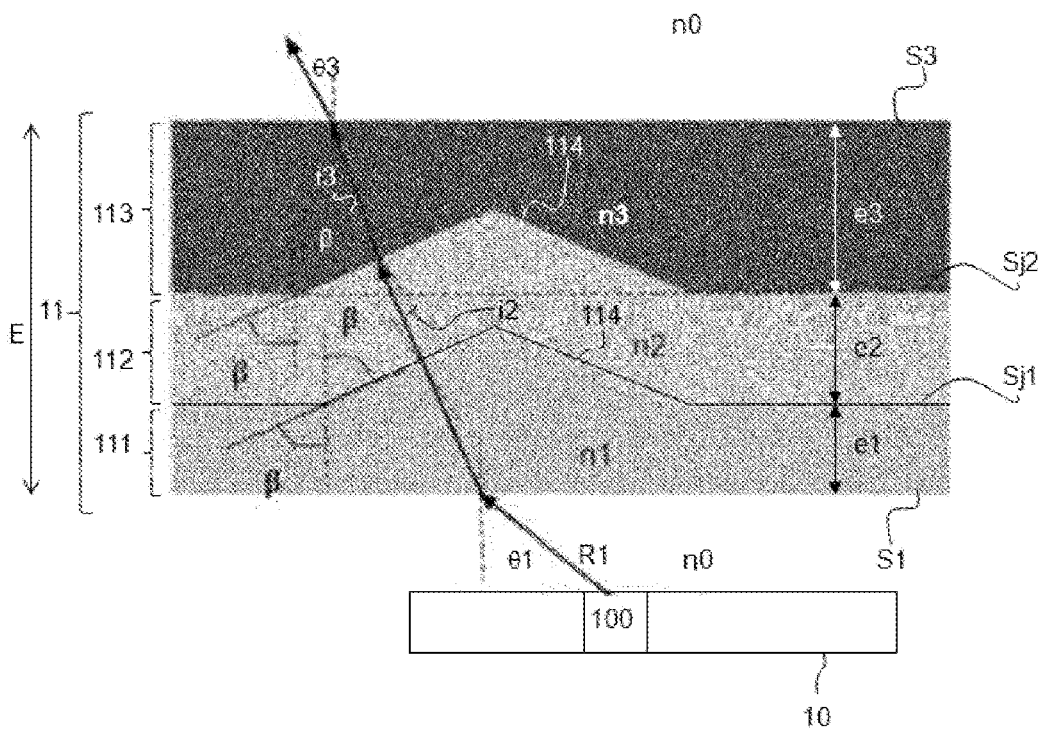

[Fig. 5]
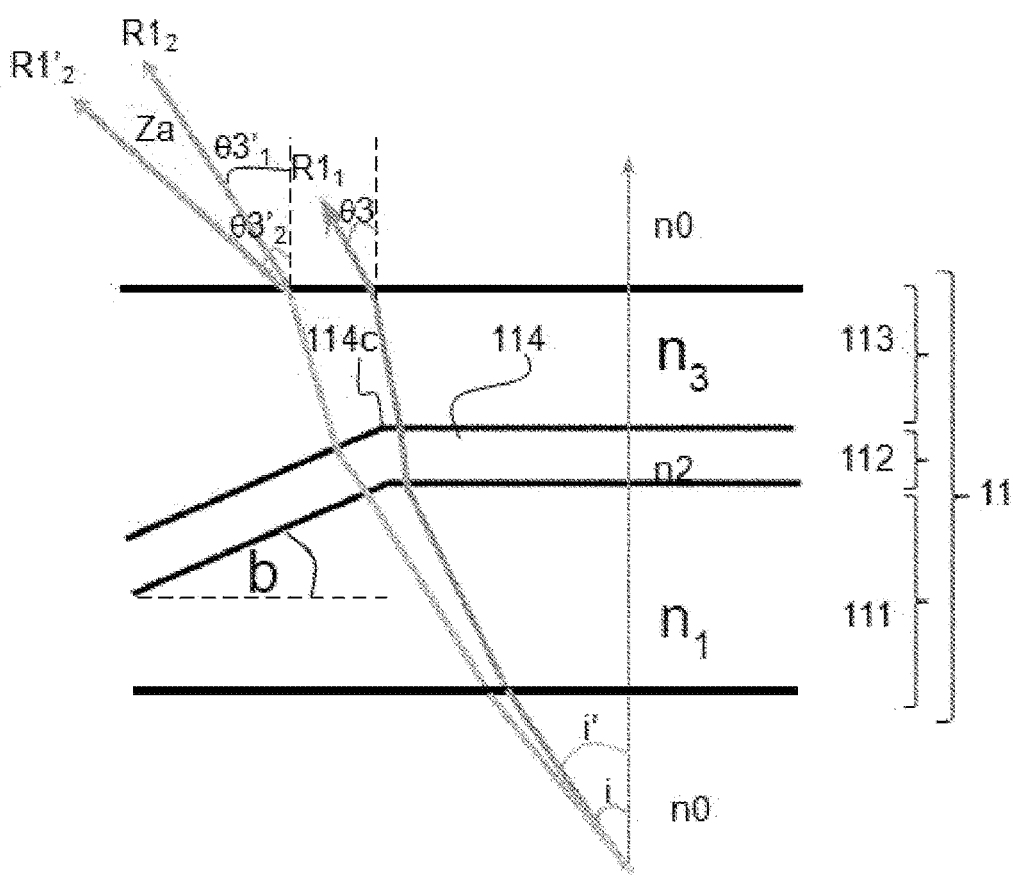

[Fig. 6]
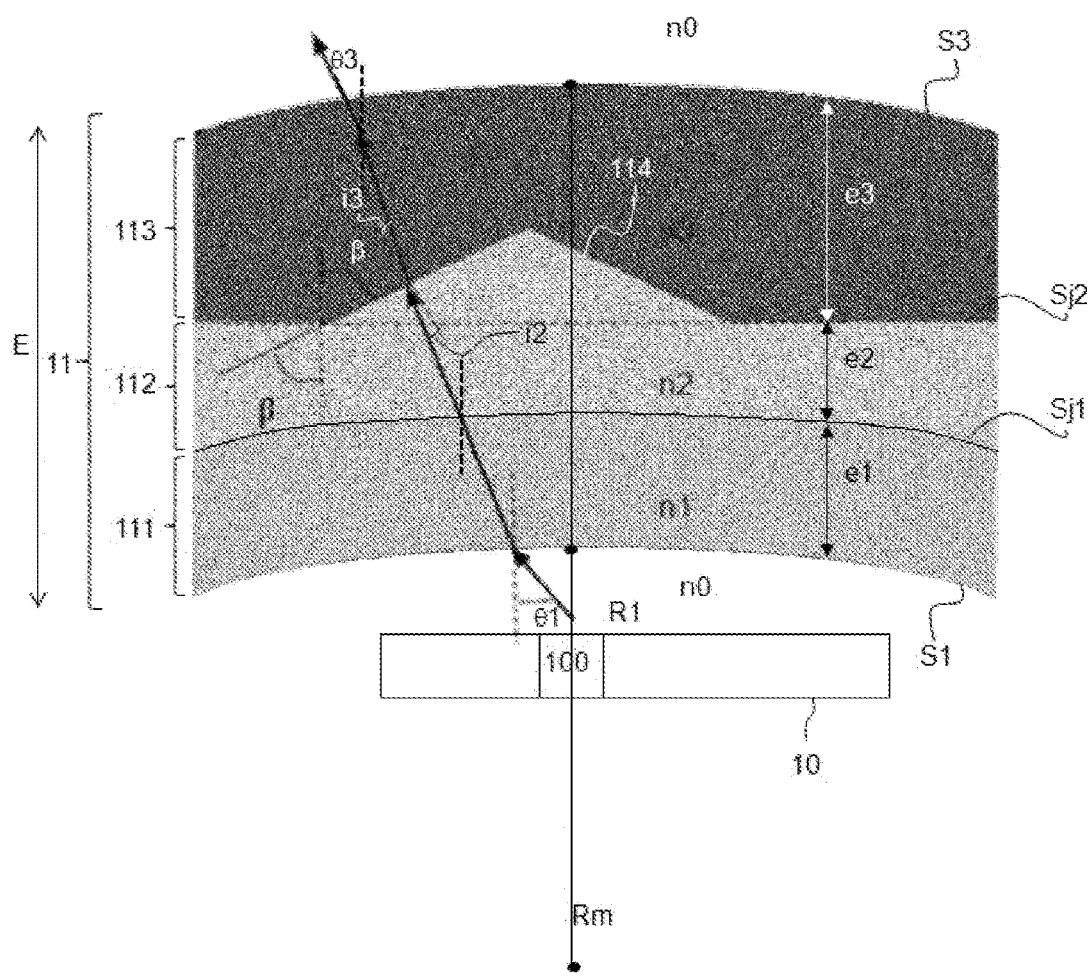

VEHICLE ASSEMBLY COMPRISING A RADAR SENSOR AND AN ARRANGEMENT OF LAYERS

TECHNICAL FIELD

The present invention relates to a vehicle assembly. It has a particular but non-limiting application in motor vehicles.

BACKGROUND OF THE INVENTION

A vehicle assembly 4 illustrated in FIG. 1 comprises, in a manner known to a person skilled in the art:
a radar sensor 40 configured to emit radar waves R4;
an arrangement of layers 41 comprising a primary layer 411 disposed facing said radar sensor 41, a secondary layer 412 having a relief 414, adjacent to the primary layer 411, and a tertiary layer 413 comprising an output surface S4 for the radar waves R4, with the primary layer 411, the secondary layer 412, the tertiary layer 413 each comprising a different refractive index.

The radar sensor 40 is designed to have a determined field of view FOV. It detects an object in the external environment of the motor vehicle.

One disadvantage of this prior art is that, due to the relief 414, this creates a prism effect that hinders the emission of the radar waves R4. Said radar waves are deflected when they pass through the arrangement of layers 41. Consequently, the field of view FOV of the radar sensor 40 includes a blind zone Za. This means that an object that is located in the external environment of the vehicle within the blind zone Za of the motor vehicle may not be detected.

SUMMARY OF THE INVENTION

Within this context, the aim of the present invention is to propose a vehicle assembly that allows the aforementioned disadvantage to be addressed.

To this end, the invention proposes a vehicle assembly for a vehicle, said vehicle assembly comprising:
a radar sensor configured to emit radar waves;
an arrangement of layers comprising a primary layer, disposed facing said radar sensor and comprising an input surface for the radar waves, a secondary layer comprising at least one relief, said secondary layer being adjacent to the primary layer and comprising a primary junction surface with said primary layer and a secondary junction surface with an adjacent tertiary layer, and said tertiary layer comprising an output surface for the radar waves parallel to said input surface, with the primary layer, the secondary layer, the tertiary layer respectively comprising a primary refractive index, a secondary refractive index, and a tertiary refractive index;
characterized in that the secondary refractive index and the tertiary refractive index are equal if the primary junction surface is parallel to the input surface and to the output surface and if the secondary layer has said relief on said secondary junction surface, or the refractive indices of the non-adjacent layers are equal if the secondary layer has a relief on said secondary junction surface and a relief on said primary junction surface and if the primary junction surface is parallel to the secondary junction surface.

According to non-limiting embodiments, the vehicle assembly can further comprise, alone or in any technically possible combination, one or more additional features selected from among the following.

According to one non-limiting embodiment, said radar sensor is a millimeter wave or a hyperfrequency wave or a microwave radar sensor.

According to one non-limiting embodiment, the secondary refractive index and the primary refractive index are equal if the primary junction surface is parallel to the input surface and to the output surface and if the secondary layer has said relief on said secondary junction surface.

According to one non-limiting embodiment, said input surface and said output surface are flat.

According to one non-limiting embodiment, said input surface and said output surface are curved.

According to one non-limiting embodiment, said input surface and said output surface have a radius of curvature $Rm=\gamma*E(da)max$, with E being the thickness of the arrangement of layers, (da)max being an angular location error tolerance of said radar sensor, $\gamma$ being a factor depending on the largest angle of the field of view of said radar sensor and the tertiary refractive index of said tertiary layer.

According to one non-limiting embodiment, said secondary layer has a thickness that is at least ten times less than that of the primary layer and of the tertiary layer.

According to one non-limiting embodiment, said primary layer is an optical layer, said secondary layer is a film layer or an opalescent layer, and said tertiary layer is an output outer lens.

According to one non-limiting embodiment, said arrangement of layers forms an illuminated logo or a radome.

An arrangement of layers is also proposed that is disposed facing a radar sensor, with said radar sensor being configured to emit radar waves, said arrangement of layers comprising a primary layer, disposed facing said radar sensor and comprising an input surface for the radar waves, a secondary layer comprising at least one relief, said secondary layer being adjacent to the primary layer and comprising a primary junction surface with said primary layer and a secondary junction surface with an adjacent tertiary layer, and said tertiary layer comprising an output surface for the radar waves parallel to said input surface, with the primary layer, the secondary layer, the tertiary layer respectively comprising a primary refractive index, a secondary refractive index, and a tertiary refractive index;
characterized in that the secondary refractive index and the tertiary refractive index are equal if the primary junction surface is parallel to the input surface and to the output surface and if the secondary layer has said relief on said secondary junction surface, or the refractive indices of the non-adjacent layers are equal if the secondary layer has a relief on said secondary junction surface and a relief on said primary junction surface and if the primary junction surface is parallel to the secondary junction surface.

BRIEF DESCRIPTION OF DRAWINGS

The invention and its various applications will be better understood upon reading the following description and with reference to its accompanying figures, in which:

FIG. 1 is a schematic figure of a vehicle assembly comprising a radar sensor and an arrangement of layers according to the prior art;

FIG. 2 is a schematic view of a vehicle assembly, with said vehicle assembly comprising a radar sensor and an arrangement of layers, according to one non-limiting embodiment of the invention;

FIG. 3 is a schematic view of the arrangement of layers of the vehicle assembly of FIG. 2, with said arrangement of layers comprising a primary layer, a secondary layer with a relief, and a tertiary layer, according to a first non-limiting embodiment;

FIG. 4 is a schematic view of the arrangement of layers of the vehicle assembly of FIG. 2, with said arrangement of layers comprising a primary layer, a secondary layer with a relief, and a tertiary layer, according to a second non-limiting embodiment;

FIG. 5 is a schematic view of two radar waves emitted by the sensor of the vehicle assembly of FIG. 2, one of which passes through a primary layer, a secondary layer and a tertiary layer of the arrangement of layers of FIG. 2 without passing through the slope of a relief of the secondary layer, and the other one of which passes through said primary layer, said secondary layer and said tertiary layer by passing through the slope of said relief of the secondary layer, according to one non-limiting embodiment; and FIG. 6 is a schematic view of the arrangement of layers of the vehicle assembly of FIG. 2, with said arrangement of layers comprising a primary layer, a secondary layer with a relief, and a tertiary layer, according to a third non-limiting embodiment.

DETAILED DESCRIPTION OF THE INVENTION

The identical elements, by structure or by function, that appear in the various figures use the same reference signs, unless otherwise specified.

The vehicle assembly 1 of a vehicle 2 according to the invention is described with reference to FIGS. 2 to 6. The vehicle assembly 1 is also called a vehicle system 1. In one non-limiting embodiment, the vehicle 2 is a motor vehicle. A motor vehicle is understood to mean any type of motorized vehicle. This embodiment is taken as a non-limiting example throughout the remainder of the description. Throughout the remainder of the description, the vehicle 2 is thus also called a motor vehicle 2. In one non-limiting embodiment, the vehicle assembly 1 is integrated in the grille of the motor vehicle 2. In another non-limiting embodiment, the vehicle assembly 1 can be integrated into a bodywork part located at the rear of the motor vehicle 2.

As illustrated in FIG. 2, the vehicle assembly 1, also called the vehicle arrangement 1, comprises:
 a radar sensor 10 configured to emit radar waves R1; —an arrangement of layers 11.
These elements are described hereafter.

The radar sensor 10 is described hereafter. As illustrated in FIG. 2, the radar sensor 10 is disposed facing the arrangement of layers 11. In one non-limiting embodiment, the radar sensor 10 is a millimeter wave (between 24 GHz and 300 GHz) or a hyperfrequency wave (between 300 MHz and 81 GHz) or a microwave (between 1 GHz and 300 GHz) radar sensor. In one non-limiting alternative embodiment, the radar sensor 10 operates at a radar frequency ranging between 76 GHz and 81 GHz. In one non-limiting embodiment, the radar waves R1 are emitted over a frequency band ranging between 100 MHz and 5 GHz. Thus, in one non-limiting example, if the radar sensor 10 operates at a radar frequency of 77 GHz, that is a wavelength $\lambda$ of 3.95 mm, with a frequency band of 1 GHz, the radar sensor 10 will operate over a frequency band of 76.5 GHz to 77.5 GHz. The radar waves R1 will thus be emitted over the frequency range 76.5 GHz to 77.5 GHz, that is a range $\Delta1$ of wavelengths $\lambda$ of 3.87 mm to 3.92 mm. Thus, in another non-limiting example, if the radar sensor 10 operates at a radar frequency of 78.5 GHz with a frequency band of 5 GHz, the radar sensor 10 will operate over a frequency band of 76 GHz to 81 GHz. The radar waves R1 will thus be emitted over the frequency range 76 GHz to 81 GHz, that is a range $\Delta1$ of wavelengths $\lambda$ of 3.701 mm to 3.945 mm.

As illustrated in FIG. 2, the radar sensor 10 has a field of view FOV. The emitted radar waves R1 arrive with an angle of incidence $\theta$ on the arrangement of layers 11. In one non-limiting embodiment, the angle of incidence $\theta$ ranges between 0° and +/−30°. The field of view FOV thus varies between −30° and +30°. The center of the field of view FOV is an angle of 0° relative to the longitudinal axis of the vehicle, also called the axis of the vehicle. In another non-limiting embodiment, the field of view FOV thus varies between −90° and +45°. The center of the field of view FOV is at an angle of −45° relative to the axis of the vehicle and the angle of incidence $\theta$ of the radar waves R1 on the arrangement of layers 11 remains close to 0° (with the vehicle assembly 1 then being positioned at approximately 45° to the axis of the vehicle). The radar sensor 10 emits the radar waves R1 in its field of view FOV as an emission beam FR1. The emission beam FR1 defines the field of view FOV of the radar sensor 10.

The radar sensor 10 is configured to scan the external environment of the motor vehicle 2, by virtue of the emission of radar waves R1. As illustrated in FIG. 2, the radar sensor 10 thus comprises:
 at least one emitter antenna 100 configured to emit radar waves R1, also called primary radar waves R1, or emitted radar waves R1;
 at least two receiver antennas 101 configured to receive return radar waves R2, also called radar waves R2 or secondary radar waves R2.

The radar sensor 10 further comprises at least one emitter 103 configured to generate the primary radar waves R1 and at least one receiver 104 configured to process the secondary radar waves R2 received in return. In one non-limiting embodiment, a single electronic component can be used for the two emission and reception functions. There will thus be one or more transceivers. Said emitter 103 generates primary radar waves R1 that are subsequently emitted by the emitter antenna 100, which waves, when they encounter an object 3 (in this case a pedestrian in the illustrated non-limiting example) in the external environment of the motor vehicle 2, reflect on said object 3. It should be noted that the object 3 is also called target object 3. The radar waves that are thus reflected are waves that are emitted back to the radar sensor 10. These are the secondary radar waves R2 received by the receiver antennas 101. These are radar waves retransmitted toward the radar sensor 10. In one non-limiting embodiment, the primary radar waves R1 and the secondary radar waves R2 are radio-frequency waves. In one non-limiting embodiment, the radar sensor 10 comprises a plurality of emitters 103 and a plurality of receivers 104.

The emitter antenna 100, also called antenna 100, is configured to emit the primary radar waves R1 generated by the emitter 103. The receiver antennas 101, also called antennas 101, are configured to receive the secondary radar waves R2 and send them to the receiver 104, which subsequently processes them. A phase shift $\Delta\varphi$, also called phase difference $\Delta\varphi$, exists between the secondary radar waves R2 received by the receiver antennas 101 that allows the angular position Pos of the object 3 relative to the motor vehicle 2 to be deduced therefrom, which object 3 is located in the external environment of the motor vehicle 2. In non-limiting embodiments, the antennas 100, 101 are patch antennas or slot antennas.

In one non-limiting embodiment, the antennas 100, 101, the emitter 103 and the receiver 104 are disposed on a printed circuit board 105. In one non-limiting embodiment, the printed circuit board is a rigid printed circuit board, also called PCBA (Printed Circuit Board Assembly) or a flexible printed circuit board, also called "Flexboard".

The radar sensor 10 further comprises an electronic control unit 106 configured to control the emitter 103 and the receiver 104. Since a radar sensor is known to a person skilled in the art, it is not described in more detail herein. In non-limiting embodiments, the phase shift Δφ is measured by the electronic control unit 106 or by the receiver 104.

The arrangement of layers 11 is described hereafter. As illustrated in FIGS. 3 to 6, it comprises:
- a primary layer 111;
- a secondary layer 112 comprising at least one relief 114;
- a tertiary layer 113.

In one non-limiting embodiment, the arrangement of layers 11 is an illuminated logo or a radome.

The primary layer 111 is disposed facing the radar sensor 10 and comprises an input surface S1 for the radar waves R1. The input surface S1 forms a diopter between the material of the primary layer 111 that has a refractive index n1 and the air that has a refractive index n0=1. The radar waves R1 arrive at this diopter S1 with an angle of incidence θ1. They pass through the primary layer 111, the secondary layer 112 and the tertiary layer 113. They emerge from the tertiary layer 113 with an angle of incidence θ3. The refractive index n1 is also called primary refractive index n1.

In one non-limiting embodiment, the primary layer 111 is an optical layer. The optical layer 111 allows the light rays to be emitted from one or more light sources (not illustrated). The optical layer 111 forms a dielectric element. In non-limiting embodiments, the dielectric element is made of a plastic, glass or ceramic material. In one non-limiting example, the plastic is polycarbonate (PC). By way of a reminder, a dielectric material is non-conductive and therefore allows through the radar waves R1, unlike a conductive material. The optical layer 111 is a transparent layer for the radar sensor 10, namely for the radar waves R1, R2. In non-limiting embodiments, the optical layer 111 can be a light guide or a lens.

The secondary layer 112 is disposed between the primary layer 111 and the tertiary layer 113. It is adjacent to the primary layer 111 and to the tertiary layer 113. The secondary layer 112 thus comprises a primary junction surface S1 (also called junction surface S1) with the primary layer 111 and a secondary junction surface Sj2 (also called junction surface Sj2) with the tertiary layer 113. It has a refractive index n2, also called secondary refractive index n2. The secondary layer 112 has a relief 114 that allows a 3D pattern to be produced. This relief 114 assumes a 3D shape. This 3D shape is stipulated by motor vehicle manufacturers, often due to reasons of style, and is therefore linked to the motor vehicle 2. In one non-limiting example illustrated in FIGS. 3, 4, and 6, the relief 114 is a prism. It assumes a pyramidal shape. In another non-limiting example, not illustrated, the relief 114 assumes a trapezoidal shape. In another non-limiting example, not illustrated, the relief 114 can be a slope. Thus, in the case of an illuminated logo, the secondary layer 112 allows the pattern of said illuminated logo to be produced. As illustrated in FIGS. 3, 4 and 6, the relief(s) 114 form(s) an angle β relative to the normal to a junction surface Sj1, Sj2. It should be noted that the smaller the angle β, the greater the slope of the relief 114. The secondary layer 112 is transparent to the radar sensor 10.

In one first non-limiting embodiment, the secondary layer 112 is a colored film layer. In one non-limiting alternative embodiment, it is approximately equal to 0.4 mm. In this case, in one non-limiting example, the film layer 112 can be deposited on the pre-molded primary layer 111 and then be overmolded with the same material as the primary layer 111 in order to produce the tertiary layer 113.

In one second non-limiting embodiment, the secondary layer 112 is an opalescent layer. In one non-limiting alternative embodiment, it is approximately equal to 2.5 mm. In this case, in one non-limiting example, the secondary layer 112 is produced by multi-injections.

The tertiary layer 113 is adjacent to the secondary layer 112. It is disposed on the side opposite the radar sensor 10, namely on the outside of the motor vehicle 2. In one non-limiting embodiment, the tertiary layer 113 is an output outer lens. In one non-limiting embodiment, the tertiary layer 113 is made of plastic. In one non-limiting example, the plastic is polycarbonate (PC). The tertiary layer 113 comprises an output surface S3 for the radar waves R1. The output surface S3 is parallel to the input surface S1. The tertiary layer 113 is transparent to the radar sensor 10 and to visible light.

In one non-limiting embodiment illustrated in FIGS. 3 and 6, the secondary layer 112 comprises a relief 114 on the secondary junction surface Sj2. In one non-limiting embodiment illustrated in FIG. 4, the secondary layer 112 comprises two reliefs 114, one of which is on the secondary junction surface Sj2 and the other one of which is on the primary junction surface Sj1.

In a first non-limiting embodiment illustrated in FIG. 3, the secondary layer 112 thus comprises said relief 114 on the secondary junction surface Sj2. The primary junction surface Sj1 does not have any relief 114. The primary junction surface Sj1 is not parallel to the secondary junction surface Sj2. The output surface S3 and the input surface S1 that are parallel to one another are flat. Furthermore, the primary junction surface Sj1 is parallel to the input surface S1 and to the output surface S3. In this first non-limiting embodiment, n2=n3. Thus, the secondary refractive index n2 and the tertiary refractive index n3 are equal if the primary junction surface Sj1 is parallel to the input surface S1 and to the output surface S3 and if the secondary layer 112 has said relief 114 on said secondary junction surface Sj2. By having n2=n3, the arrangement of layers 11 is seen by the radar sensor 10 as an arrangement of equivalent layers that comprises two layers (the secondary layer 112 and the tertiary layer 113) with surfaces S3, Sj2, Sj1 that are parallel to one another. θ3=θ1 is then obtained. If the secondary refractive index n2 was different from the tertiary refractive index n3, as in the prior art, the angle of incidence θ3 would be different from the angle of incidence θ1, with θ3 being even more different from θ1 the smaller the angle β. The smaller the angle β, the greater the blind zone Za, seen in the prior art, also called shadow zone, of the field of view FOV. Thus, by taking n2=n3, even in the presence of a relief 114 on the secondary layer 112, there is no longer any blind zone Za in the field of view FOV of the radar sensor 10. It should be noted that n2 sin i2=n3 sin i3, with i2 being the angle of incidence of the radar wave R1 relative to the surface of the relief 114 and i3 being the corresponding refracted angle. Therefore, i3=i2. Therefore, there is no deflection of the radar wave R1 between the secondary layer 112 and the tertiary layer 113.

In one non-limiting alternative embodiment of this first non-limiting embodiment, then moreover n2=n1. Therefore, n3=n2=n1. Thus, the secondary refractive index n2 and the primary refractive index n1 are equal if the primary junction surface Sj1 is parallel to the input surface S1 and to the output surface S3 and if the secondary layer 112 has said relief 114 on said secondary junction surface Sj2. There is a homogeneous arrangement of layers 11 for the radar sensor 10. The computation of the phase difference Δφ between two return radar waves R2 is simple. Δφ=2π.d1.sin(i1)/λ. With d1 being the distance between the two receiver antennas 101 (illustrated in FIG. 1), and i1 being the angle of incidence of the return radar waves R2 on the arrangement of layers 11 (illustrated in FIG. 1). The computation of the phase difference Δφ does not need to be corrected. The thickness e2 of the secondary layer 112 does not need to be very small relative to the thicknesses e1, e3 of the primary layer 111 and of the tertiary layer 113.

In a second non-limiting embodiment illustrated in FIG. 4, the secondary layer 112 comprises a relief 114 on the secondary junction surface Sj2 and a relief 114 on the primary junction surface Sj1. Furthermore, the primary junction surface Sj1 is parallel to the secondary junction surface Sj2. The output surface S3 and the input surface S1 that are parallel to one another are flat. In this second non-limiting embodiment, n1=n3. Thus, the refractive indices n1, n3 of the non-adjacent layers (the primary layer 111, and the tertiary layer 113) are equal if the secondary layer 112 has two reliefs 114, one on said secondary junction surface Sj2 and the other one on said primary junction surface S1. By having n1=n3, the arrangement of layers 11 is seen by the radar sensor 10 as an arrangement of equivalent layers comprising two layers (the primary layer 111 and the tertiary layer 113) with surfaces S3, Sj2, Sj1, S1 that are parallel to one another. θ3=θ1 is then obtained. If the secondary refractive index n1 was different from the tertiary refractive index n3, as in the prior art, the angle of incidence θ3 would be different from the angle of incidence θ1, with θ3 being even more different from θ1 the smaller the angle β. The smaller the angle β, the greater the blind zone Za, seen in the prior art, also called shadow zone, of the field of view FOV. Thus, by taking n1=n3, there is no longer any blind zone Za in the field of view FOV of the radar sensor 10.

FIG. 5 illustrates a radar wave R11 that passes through the primary layer 111, the secondary layer 112 and the tertiary layer 113 without passing through the slope of the relief 114 and a radar wave R12 that passes through the primary layer 111, the secondary layer 112 and the tertiary layer 113 by passing through the slope of the relief 114. Then: θ3=i and θ3'=asin(n3 sin(b−asin(n1/n3 sin(b−asin(sin(i')/n1)))), with θ3 being the angle of incidence of the radar wave R11 and θ3' being the angle of incidence of the radar wave R12 and b=π/2−β. When n1=n3, then θ3'=i' (that is θ31'=i', as illustrated in FIG. 5), and there is no blind zone Za. If this is not the case, for example, if n1=1.6, n3=1.8, b=30°, with 20° being the angular position of the corner 114c of the relief 114 and i and i' tending toward this angular position of the corner 114c, there would be a radar wave R1'2, with θ3=i=20°, but θ3'≠i'=30° (that is θ32'≠i'=30°, as illustrated in FIG. 5), and therefore a blind zone Za of 10°. It should be noted that in the illustrated non-limiting example, the relief 114 assumes a trapezoidal shape. Thus, since n1=n3, even in the presence of reliefs 114 on the secondary layer 112, there is no longer any blind zone Za.

In a third non-limiting embodiment illustrated in FIG. 6, the secondary layer 112 comprises said relief 114 on the secondary junction surface Sj2. The primary junction surface Sj1 does not have any relief 114. The primary junction surface Sj1 is not parallel to the secondary junction surface Sj2. The output surface S3 and the input surface S1 that are parallel to one another are curved. Furthermore, the primary junction surface Sj1 is parallel to the input surface S1 and to the output surface S3. It should be noted that having a curved output surface S3 and a curved input surface S1 allows a smaller angle of incidence θ1 to be provided than if the output surface S3 and the input surface S1 were flat. There are thus fewer return reflections on the radar sensor 10 and less disturbances for said radar sensor 10. The input surface S1 and the output surface S3 have a radius of curvature Rm=γ*E(da)max, with E being the thickness of the arrangement of layers 11, (da)max being an angular location error tolerance of the radar sensor 10, γ being a factor depending on the largest angle of the field of view FOV of the radar sensor 10 and the refractive index n3 of the tertiary layer 113. Then:

$$\gamma = \frac{n^2 \cos(a_{max}) \sin(a_{max})}{\left(n^2 - si\,(a_{max})^2\right)^{3/2}} \qquad \text{Math 1}$$

Rm is computed for the input surface S1 and Rm for the output surface S3. Therefore, n equals n1 or n3 and amax is the maximum value of θ1 (for S1) and of θ3 (for S3), with θ1 and θ3 being the angles of incidence relative to a vertical relative to a parallel to the emission axis of the radar sensor 10 (which is the axis starting from the emission antenna 100 toward the center of the field of view FOV).

In this third non-limiting embodiment, n2=n3. Thus, the secondary refractive index n2 and the tertiary refractive index n3 are equal if the primary junction surface Sj1 is parallel to the input surface S1 and to the output surface S3 and if the secondary layer 112 has said relief 114 on said secondary junction surface Sj2. By having n2=n3, the arrangement of layers 11 is seen by the radar sensor 10 as an arrangement of equivalent layers comprising two layers (the secondary layer 112 and the tertiary layer 113) with surfaces S3, Sj2, Sj1 that are parallel to one another. θ3=θ1 is then obtained. If the secondary refractive index n2 was different from the tertiary refractive index n3, as in the prior art, the angle of incidence θ3 would be different from the angle of incidence θ1, with θ3 being even more different from θ1 the smaller the angle β. The smaller the angle β, the greater the blind zone Za, also called shadow zone, of the field of view FOV. Thus, by taking n2=n3, even in the presence of a relief 114 on the secondary layer 112, there is no longer any blind zone Za in the field of view FOV of the radar sensor 10. It should be noted that n2 sin i2=n3 sin i3, with i2 being the angle of incidence of the radar wave R1 relative to the surface of the relief 114 and i3 being the corresponding refracted angle.

In one non-limiting alternative embodiment of this third non-limiting embodiment, then moreover n2=n1. Thus, the secondary refractive index n2 and the primary refractive index n1 are equal if the primary junction surface Sj1 is parallel to the input surface S1 and to the output surface S3 and if the secondary layer 112 has said relief 114 on said secondary junction surface Sj2.

It should be noted that when one or more reliefs 114 exists, as illustrated in FIGS. 3, 4, 6, the measured phase difference Δφ between two return radar waves R2 does not follow the conventional formula Δφ=2π.d1.sin(i1)/λ, but follows a more complex law depending on the position of the receiver antennas 101 relative to each other relative to the arrangement of layers 11, and on the relief(s) 114. Furthermore, conventionally a correction law needs to be applied to the measurement of the phase shift Δφ performed to return to a value computed according to the conventional formula. In order to avoid applying such a correction law that will change for each new design of the vehicle assembly 1, in one non-limiting embodiment, the secondary layer 112 has a thickness e2 that is at least ten times less than that e1, e3 of the primary layer 111 and of the tertiary layer 113. It should be noted that e1, e2 and e3 are the average thicknesses. Thus, the measurement of the phase shift Δφ will be close enough to the value computed according to the conventional law. The difference will be negligible.

Of course, the description of the invention is not limited to the embodiments described above and to the field described above. Thus, in another non-limiting embodiment, the radar sensor 10 comprises more than one emitter antenna 100 and more than two receiver antennas 101. Thus, in another non-limiting embodiment, the arrangement of layers 11 comprises more than three layers. Thus, in non-limiting examples, the arrangement of layers 11 can comprise a scattering layer, and/or a reflective layer, and/or an opaque layer.

Thus, the invention described particularly has the following advantages:
- it prevents the computation of the angular position of a target object 3 from being affected by a 3D shape of a layer in the arrangement of layers 11;
- it allows the blind zone Za to be eliminated.

What is claimed is:

1. A vehicle assembly for a vehicle, the vehicle assembly comprising:
    a radar sensor configured to emit radar waves;
    an arrangement of layers including a primary layer, disposed facing the radar sensor and having an input surface for the radar waves, a secondary layer including at least one relief, the secondary layer being adjacent to the primary layer and having a primary junction surface with the primary layer and a secondary junction surface with an adjacent tertiary layer, and the tertiary layer including an output surface for the radar waves parallel to the input surface, with the primary layer, the secondary layer, the tertiary layer respectively including a primary refractive index, a secondary refractive index, and a tertiary refractive index;
    with the secondary refractive index and the tertiary refractive index being equal if the primary junction surface is parallel to the input surface and to the output surface and if the secondary layer has the at least one relief on the secondary junction surface, or, the refractive indices of the non-adjacent layers are equal if the secondary layer has a relief on the secondary junction surface and a relief on the primary junction surface and if the primary junction surface is parallel to the secondary junction surface;
    with the input surface and the output surface being curved and having a radius of curvature $Rm=\gamma*E(da)max$, with E being the thickness of the arrangement of layers, $(da)max$ being an angular location error tolerance of the radar sensor, γ being a factor depending on the largest angle of the field of view of the radar sensor and the tertiary refractive index of the tertiary layer.

2. The vehicle assembly as claimed in claim 1, wherein the radar sensor is a millimeter wave or a hyperfrequency wave or a microwave radar sensor.

3. The vehicle assembly as claimed in claim 1, wherein the secondary refractive index and the primary refractive index are equal if the primary junction surface is parallel to the input surface and to the output surface and if the secondary layer has the at least one relief on the secondary junction surface.

4. The vehicle assembly as claimed in claim 1, wherein the secondary layer has a thickness that is at least ten times less than that of the primary layer and of the tertiary layer.

5. The vehicle assembly as claimed in claim 1, wherein the primary layer is an optical layer, the secondary layer is a film layer or an opalescent layer, and the tertiary layer is an output outer lens.

6. The vehicle assembly as claimed in claim 1, wherein the arrangement of layers forms an illuminated logo or a radome.

7. An arrangement of layers disposed facing a radar sensor, the radar sensor being configured to emit radar waves, the arrangement of layers comprising a primary layer, disposed facing the radar sensor and including an input surface for the radar waves, a secondary layer including at least one relief, the secondary layer being adjacent to the primary layer and including a primary junction surface with the primary layer and a secondary junction surface with an adjacent tertiary layer, and the tertiary layer including an output surface for the radar waves parallel to the input surface, with the primary layer, the secondary layer, the tertiary layer respectively including a primary refractive index, a secondary refractive index, and a tertiary refractive index;
    with the secondary refractive index and the tertiary refractive index being equal if the primary junction surface is parallel to the input surface and to the output surface and if the secondary layer has the at least one relief on the secondary junction surface, or, the refractive indices of the non-adjacent layers are equal if the secondary layer has a relief on the secondary junction surface and a relief on the primary junction surface and if the primary junction surface is parallel to the secondary junction surface;
    with the input surface and the output surface being curved and having a radius of curvature $Rm=\gamma*E(da)max$, with E being the thickness of the arrangement of layers, $(da)max$ being an angular location error tolerance of the radar sensor, γ being a factor depending on the largest angle of the field of view of the radar sensor and the tertiary refractive index of the tertiary layer.

* * * * *